(12) United States Patent
Mundon et al.

(10) Patent No.: US 10,145,354 B2
(45) Date of Patent: Dec. 4, 2018

(54) FLUID POWER GEARBOX AND DRIVETRAIN FOR A WAVE ENERGY CONVERTER

(71) Applicant: Oscilla Power, Inc., Seattle, WA (US)

(72) Inventors: Timothy R Mundon, Seattle, WA (US); Jeff Campbell, Spanish Fork, UT (US)

(73) Assignee: OSCILLA POWER INC., Seattle, WA (US)

( * ) Notice: Subject to any disclaimer, the term of this patent is extended or adjusted under 35 U.S.C. 154(b) by 0 days.

(21) Appl. No.: 15/675,511

(22) Filed: Aug. 11, 2017

(65) Prior Publication Data

US 2018/0045166 A1 Feb. 15, 2018

Related U.S. Application Data

(60) Provisional application No. 62/373,874, filed on Aug. 11, 2016.

(51) Int. Cl.
| | |
|---|---|
| *F03B 13/10* | (2006.01) |
| *F03B 13/12* | (2006.01) |
| *F03B 13/20* | (2006.01) |
| *H02K 7/18* | (2006.01) |

(52) U.S. Cl.
CPC ........... *F03B 13/20* (2013.01); *H02K 7/1876* (2013.01); *F05B 2260/406* (2013.01)

(58) Field of Classification Search
CPC ........ F03B 13/20; F03B 13/262; F03B 13/16; F03B 13/187

USPC ....................................................... 290/42, 53
See application file for complete search history.

(56) References Cited

U.S. PATENT DOCUMENTS

| | | | | | |
|---|---|---|---|---|---|
| 4,454,429 | A | * | 6/1984 | Buonome | F03B 13/18 290/42 |
| 6,109,029 | A | * | 8/2000 | Vowles | B01D 61/10 270/42 |
| 6,644,027 | B1 | * | 11/2003 | Kelly | F03B 13/1845 60/498 |
| 8,035,243 | B1 | * | 10/2011 | Mesa | F03B 13/1815 290/42 |
| 8,240,140 | B2 | * | 8/2012 | McBride | F15B 1/024 60/327 |
| 9,467,022 | B2 | * | 10/2016 | Verdegem | F03B 13/14 |
| 2004/0007881 | A1 | * | 1/2004 | Kobashikawa | B01D 61/10 290/53 |

(Continued)

*Primary Examiner* — Tulsidas C Patel
*Assistant Examiner* — Thomas Quigley
(74) *Attorney, Agent, or Firm* — Kunzler P.C.

(57) ABSTRACT

An apparatus, system, and method are disclosed for power transfer system for a wave energy converter. The system includes a plurality of hydraulic cylinders including a first cluster of input cylinders and a second cluster of output cylinders. The input cylinders are coupled to an underwater structure and are configured to receive an input force from a relative motion between a buoy housing and the underwater structure. The output cylinders are configured to transfer an output force to an electric generator. The power transfer system further includes a hydraulic connection between the input cylinders and the output cylinders. The hydraulic connection is configurable to switch a portion of the hydraulic cylinders into and out of the hydraulic connection between the input cylinders and the output cylinders.

20 Claims, 6 Drawing Sheets

(56) References Cited

U.S. PATENT DOCUMENTS

| | | | | |
|---|---|---|---|---|
| 2007/0257491 | A1* | 11/2007 | Kornbluh | F03B 13/1845 290/53 |
| 2008/0012344 | A1* | 1/2008 | Buffard | F03B 13/187 290/53 |
| 2008/0238103 | A1* | 10/2008 | Montgomery | F03B 13/1865 290/53 |
| 2010/0043425 | A1* | 2/2010 | Dragic | F03B 13/1855 60/504 |
| 2010/0283263 | A1* | 11/2010 | Schilling | F01B 23/10 290/1 R |
| 2010/0307156 | A1* | 12/2010 | Bollinger | H02J 15/006 60/682 |
| 2011/0296823 | A1* | 12/2011 | McBride | F15B 1/024 60/407 |
| 2012/0047884 | A1* | 3/2012 | McBride | F03G 6/00 60/327 |
| 2012/0091709 | A1* | 4/2012 | Hobdy | F03B 13/20 290/42 |
| 2012/0104761 | A1* | 5/2012 | Vamvas | F03B 13/16 290/53 |
| 2012/0119510 | A1* | 5/2012 | Herzen | F03D 9/28 290/1 C |
| 2012/0285544 | A1* | 11/2012 | Westby | F03B 13/1885 137/1 |
| 2013/0236347 | A1* | 9/2013 | Lundback | F03B 13/189 418/191 |
| 2017/0067454 | A1* | 3/2017 | Karamanev | H02J 15/006 |
| 2017/0279303 | A1* | 9/2017 | Bauer | H02K 7/1823 |

* cited by examiner

| Tank 1 Volume (L): 1800 | Tank 2 Volume (L): 900 | Tank 3 Volume (L): 450 | Total Volume (L) | Achieved SC (kN/m) |
|---|---|---|---|---|
| 0 | 0 | 0 | 194.58 | 5139.4 |
| 0 | 0 | 1 | 644.58 | 1551.4 |
| 0 | 1 | 0 | 1094.58 | 913.6 |
| 0 | 1 | 1 | 1544.58 | 647.4 |
| 1 | 0 | 0 | 1994.58 | 501.4 |
| 1 | 0 | 1 | 2444.58 | 409.1 |
| 1 | 1 | 0 | 2894.58 | 345.5 |
| 1 | 1 | 1 | 3344.58 | 299.0 |

*1 and 0 indicate whether the tank valve is on or off*

FLUID POWER GEARBOX AND DRIVETRAIN FOR A WAVE ENERGY CONVERTER

CROSS-REFERENCES TO RELATED APPLICATIONS

This application claims the benefit of U.S. Provisional Patent Application No. 62/373,874 entitled "FLUID POWER GEARBOX AND DRIVETRAIN FOR A WAVE ENERGY CONVERTER" and filed on Aug. 11, 2016 for Timothy R. Mundon, et al., which is incorporated herein by reference.

FIELD

This invention relates to power generation and more particularly relates to a power transfer system for a wave energy converter

BACKGROUND

Many different systems exist for power generation. With advances in technology comes the need to provide power to operate that technology. Frequently, power generation must be portable or able to collect energy from diverse environments without doing damage to that environment. Many conventional systems are restricted in where and how they may be deployed and also rely on wasteful, harmful, or unsustainable processes.

SUMMARY

A power transfer system for a wave energy converter is disclosed. In an embodiment, the power transfer system for a wave energy converter includes a plurality of hydraulic cylinders including a first cluster of input cylinders and a second cluster of output cylinders. The input cylinders are coupled to an underwater structure and are configured to receive an input force from a relative motion between a buoy housing and the underwater structure. The output cylinders are configured to transfer an output force to an electric generator. The power transfer system further includes a hydraulic connection between the input cylinders and the output cylinders. The hydraulic connection is configurable to switch a portion of the hydraulic cylinders into and out of the hydraulic connection between the input cylinders and the output cylinders. An apparatus and method also perform the functions of the system.

In an embodiment, the power transfer system includes at least one offset cylinder, the at least one offset cylinder configured to offset a weight of the underwater structure.

In an embodiment, the offset cylinder is coupled to a gas charged accumulator.

In an embodiment, the offset cylinder is pressurized to provide an offset force opposite to the weight of the underwater structure.

In an embodiment, the offset cylinder is one of a hydraulic system or pneumatic system.

In an embodiment, the offset cylinder is hydraulically isolated from the output cylinders.

In an embodiment, the offset cylinder is coupled to a gas charged accumulator with an air tank array. In an embodiment, the air tank array includes an array of differently sized air tanks.

In an embodiment, the input cylinders are arranged mechanically and hydraulically in parallel to each other.

In an embodiment, the input cylinders include a first group of input cylinders and a second group of input cylinders having a different size than the first group. In an embodiment, the hydraulic connection is configurable to switch the first group or the second group into and out of the hydraulic connection between the input cylinders and the output cylinders.

In an embodiment, the input cylinders are spatially distributed on a structural member, the structural member mechanically coupled to the input cylinders.

In an embodiment, the power transfer system includes a power dissipation network, and one or more valves to control distribution of power between the electrical generator and the power dissipation network.

In an embodiment, the power dissipation network includes a network of pressure reducing valves configured to dissipate energy by passing fluid through controlled diameter orifices to create heat and then cooling the fluid by passing through a heat exchanger network.

In an embodiment, the power transfer system for a wave energy converter includes a plurality of hydraulic cylinders including a first cluster of input cylinders and a second cluster of output cylinders. The input cylinders are coupled to an underwater structure and are configured to receive an input force from a relative motion between a buoy housing and the underwater structure. The output cylinders are configured to transfer an output force to an electric generator. The power transfer system further includes a hydraulic connection between the input cylinders and the output cylinders and at least one offset cylinder configured to offset a weight of the underwater structure. An apparatus and method also perform the functions of the system.

In an embodiment, the hydraulic connection is configurable to switch a portion of the hydraulic cylinders into and out of the hydraulic connection between the input cylinders and the output cylinders.

In an embodiment, the offset cylinder is coupled to a gas charged accumulator with an air tank array, and wherein the accumulator provides elastic absorption of energy with an effective spring constant being a function of an extendable air volume in the air tank array.

In an embodiment, the extendable air volume is configured to provide a variable pressure providing an offset force to the weight of the underwater structure.

In an embodiment, the power transfer system includes a power dissipation network connected in series with the air tank array.

In an embodiment, the power dissipation network includes a network of pressure reducing valves configured to dissipate energy by passing fluid through controlled diameter orifices to create heat and then cooling the fluid by passing through a heat exchanger network.

In an embodiment, the power transfer system includes a fluid balancing network including an external supply of fluid configurable to enter the input cylinders to compensate for fluid loss in the input cylinders.

In an embodiment, the power transfer system for a wave energy converter includes a plurality of hydraulic cylinders including a first cluster of input cylinders and a second cluster of output cylinders. The input cylinders are coupled to an underwater structure and are configured to receive an input force from a relative motion between a buoy housing and the underwater structure. The output cylinders are configured to transfer an output force to an electric generator. The power transfer system further includes a hydraulic connection between the input cylinders and the output cylinders. The hydraulic connection is configurable to switch a portion of the hydraulic cylinders into and out of the hydraulic connection between the input cylinders and the output cylinders. The power transfer system further includes at least one offset cylinder configured to offset a weight of the underwater structure. The offset cylinder is coupled to a gas charged accumulator with an air tank array, and the air tank array includes an array of differently sized air tanks. The power transfer system further includes a power dissipation network with one or more valves to control distribution of power between the electrical generator and the power dissipation network. An apparatus and method also perform the functions of the system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

In a hydraulic load enhancement system, an applied force imparted onto the energy generation device/system from the environment may cause a piston to compress a fluid (e.g. hydraulic oil). The energy stored in the pressurized fluid can then be used to apply a mechanical load to a generator housed in the buoy. The use of hydraulics can create advantages in the harvesting of energy from this system. The force on the tethers causes a piston to compress a fluid such as hydraulic oil. The energy stored in the pressurized fluid can then be used to apply a mechanical load to an electrical generator. In some embodiments, the hydraulic energy would be to move a piston of a different bore size to obtain a force amplification/reduction which could be applied to the electrical generator. This could be advantageous for power production, as a greater force multiplication will enhance the effective power density of the system. In some embodiments, such a system could be used to implement a way to prevent extreme loads caused by large waves to be applied to the system. This could be done by using a valve to release the pressure over a certain value. In some embodiments, a double acting hydraulic cylinder such that the system is compressing the fluid on a tensile and compressive applied load. Another proposed use of the hydraulics would be a double acting hydraulic cylinder such that the system is compressing the fluid on both sides of the wave.

This invention relates to a buoy/mooring system with electrical generators disposed inside the buoy or inside an enclosure located at the bottom of a tether or disposed on a length of the tether.

Figure 1:
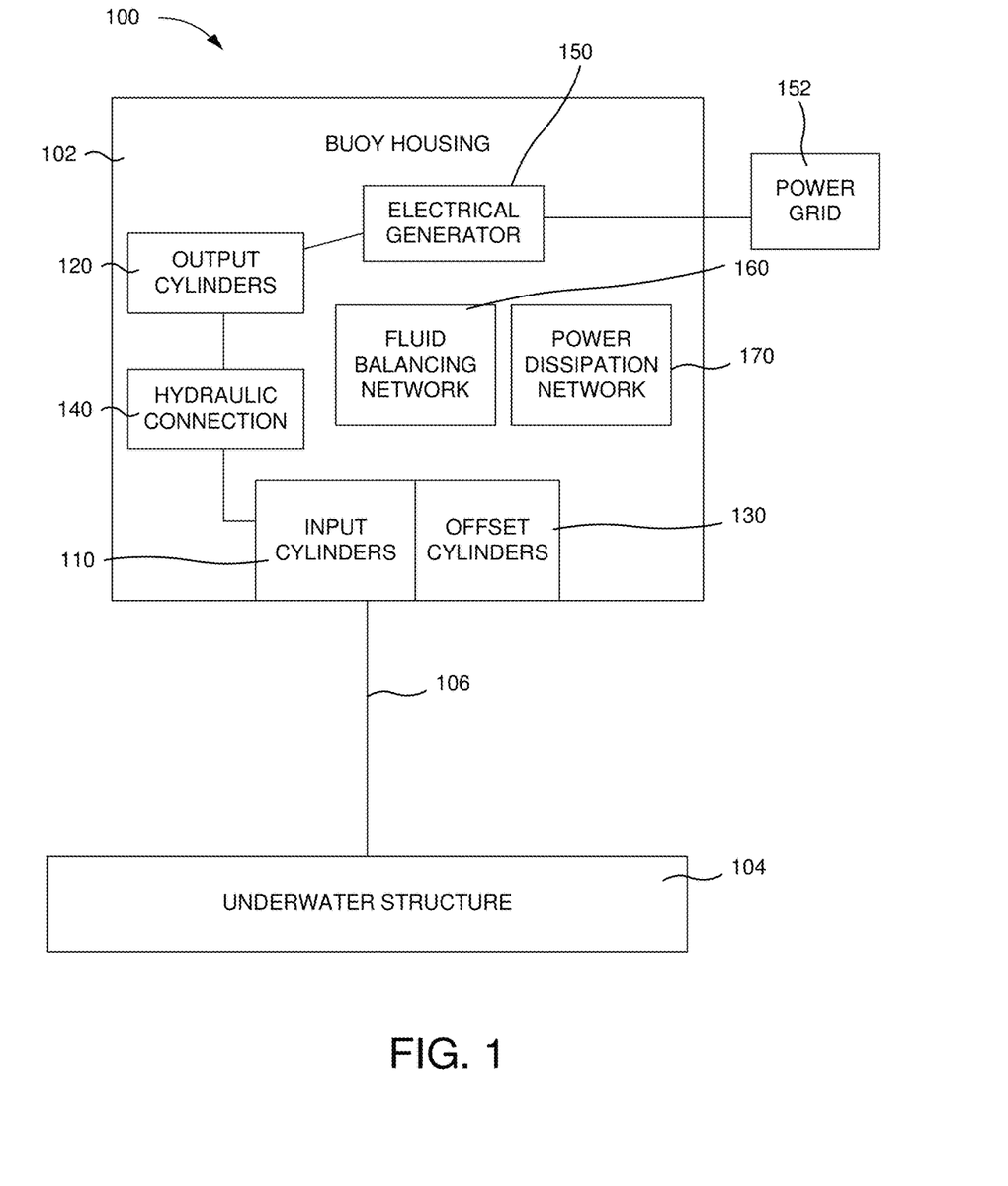
FIG. 1 is a schematic diagram illustrating one embodiment of a power transfer system for a wave energy converter in accordance with one embodiment of the present invention.

FIG. 1 is a schematic diagram illustrating one embodiment of a power transfer system 100 for a wave energy converter in accordance with one embodiment of the present invention. Although the power transfer system 100 is shown and described with certain components and functionality, other embodiments of the power transfer system 100 may include fewer or more components to implement less or more functionality. Although many of the components are depicted as within the buoy housing 102, in other embodiments, the components are within an enclosure along the tether 106 or at the underwater structure 104.

The power transfer system 100 includes a buoy housing 102 and an underwater structure 104 coupled together with a tether 106. The buoy housing 102 is a surface float or a near surface float that moves floats near or on the surface of a body of water. The buoy housing 102 moves with the waves of the body of water. As the buoy housing 102 oscillates on the surface of the body of water, the buoy housing 102 will move relative to the underwater structure 104. The relative motion between the buoy housing 102 and the underwater structure 104 creates tension and forces on the tether 106. The forces from the relative motion are captured as is described more fully herein as well as in the references incorporated herein.

The buoy housing 102 is of an enclosure shaped to house the various components described herein. The buoy housing 102 may include various seals or other structural components to isolate an interior chamber that houses the various components.

The underwater structure 104 may be any structure configured to be submerged in the body of water. In some embodiments, the underwater structure 104 is an anchor attached to the sea floor. In some embodiments, the underwater structure 104 is a heave plate or other structure that restricts that movement in the water. As the buoy housing 102 oscillates on the surface of the body of water, the underwater structure 104 will counteract such motion which will exert forces on the tether 106.

The tether 106 may be any type of cord, chain, rope, cable, etc. that is configured to couple the buoy housing 102 to the underwater structure 104. Although only one tether 106 is depicted, the system may include a plurality of tethers 106 which couple the buoy housing 102 to the underwater structure 104. In some embodiments, the tether 106 is configured to enter the interior chamber of the buoy housing 102 through a sealed entry point. In some embodiments, the tether 106 is configured to attach to a bearing or other structural component outside the buoy housing 102 with the bearing or structural component configured to enter the interior chamber of the buoy housing 102 through the sealed entry point.

The power transfer system 100 further includes a plurality of hydraulic cylinders. In some embodiments, the plurality of hydraulic cylinders includes a first cluster of input cylinders 110 and a second cluster of output cylinders 120. In some embodiments, the input cylinders 110 receive mechanical energy from a system mechanical input. In some embodiments, the input cylinders 110 are coupled to the underwater structure 104 and are further configured to receive an input force. The input force is exerted from a relative motion between the buoy housing 102 and the underwater structure 104 and may be exerted by the tether 106.

The output cylinders 120 are hydraulically connected via a hydraulic connection 140 to the input cylinders 110. In some embodiments, the output cylinders 120 are configured to transfer an output force to an electric generator 150. The ratio of area of the output cylinders 120 to the area of the input cylinders 110 will dictate the amount of power transferred to the electric generator 150. The output cylinders 120 are configured to transfer an output force to an electric generator 150. Depending on the ratio of area of the output cylinders 120 over the area of the input cylinders 110 will dictate the amount of power transferred to the electric generator 150. In some embodiments, the electric generator 150 is a linear generator.

The hydraulic connection 140 may include various valves, actuators, accumulators, overpressure valves, controllers, and other components that are configurable to switch a portion of the hydraulic cylinders into and out of the hydraulic connection between the input cylinders 110 and the output cylinders 120. That is, in some embodiments, the there are a plurality of input cylinders 110 including a first group and a second group. The first group of input cylinders 110 may have a different size or area than the second group of input cylinders 110 and the hydraulic connection is configured with an ability to disconnect or divert the first group of input cylinders 110 from hydraulically connecting to the output cylinders 120 while hydraulically connecting the second group of input cylinders 110 to the output cylinders.

The ratio of area of the input cylinders 110 and output cylinders 120 can be adjusted to the need of the wave pattern where the buoy housing 102 is deployed. The hydraulic connection is configurable to switch a portion of the hydraulic cylinders into and out of the hydraulic connection 140. Although described in conjunction with the input cylinders 110, the hydraulic connection 140 may be configured to switch a portion of the output cylinders 120 into and out of the hydraulic connection between the input cylinders 110 and the output cylinders 120. In either case, the ratio of area is adjusted.

The hydraulic connection 140 may be configured to change automatically based on a wave pattern or may be controlled remotely through a controller. In some embodiments, the hydraulic connection 140 may be adjusted manually prior to deployment of the buoy system.

The power transfer system 100 may further include at least one offset cylinder 130. The offset cylinders 130 are configured to offset a weight of the underwater structure 104. That is, even with no relative motion between the buoy housing 102 and the underwater structure 104, the weight of the underwater structure 104 will exert a force on the input cylinders 110 through the tether 106. Through the offset cylinders 130, the weight of the underwater structure 104 and the tether 106 may be compensated for so as to allow the input cylinders 110 to operate and oscillate around an equilibrium state.

In some embodiments, the offset cylinders 130 are coupled to a gas charged accumulator. In some embodiments, the gas charged accumulator provides elastic absorption of energy with an effective spring constant being a function of extendable air volume in the air tank array. In some embodiments, the extendable air volume is configured to provide a variable pressure providing an offset force to the weight of the underwater structure.

In some embodiments, the air tank array includes an array of differently sized air tanks that function differently. The size or volume of the air tank will dictate the rise in resistive force. For example, a larger volume air tank will result in the resistive force increasing more slowly than the resistive force for a smaller volume air tank.

In some embodiments, the offset cylinders 130 are pressurized to provide an offset force opposite to the weight of the underwater structure 104. In some embodiments, the offset cylinders 130 are pressurized in order to provide a mean load to the tether 106 that offsets any mean offset tension within the tether 106.

In some embodiments, the air volume is configured to be able to provide a variable pressure to allow a tunable mean offset load for the system. In some embodiments, the system includes a single air tank. In some embodiments, the system includes multiple air tanks. In some embodiments, the air tanks are arranged in parallel and are interconnected via valves that isolate or engage the individual air tanks.

In some embodiments, the offset cylinders 130 are part of a hydraulic system. In some embodiments, the offset cylinders are part of a pneumatic system. In some embodiments, the offset cylinders 130 are one of a hydraulic system or a pneumatic system.

In some embodiments, the offset cylinders 130 are isolated from the output cylinders 120. In some embodiments, the offset cylinders 130 are hydraulically isolated from the output cylinders 120. In some embodiments, the offset cylinders 130 are hydraulically isolated from the input cylinders and the output cylinders 120. In some embodiments, the offset cylinders 130 are mechanically isolated from the output cylinders 120. In some embodiments, the offset cylinders 130 are mechanically coupled or yoked to the input cylinders 110.

In some embodiments, the offset cylinders 130 are coupled to a gas charged accumulator with an air tank array. In some embodiments, the offset cylinders 130 are part of a sealed hydraulic and/or pneumatic system that absorbs and releases energy during each cycle of the wave energy converter. In some implementations, the volume of air in the pneumatic system is chosen to be large relative to the total displaced hydraulic volume. The offset cylinders further serve to provide the restoring force that enables a sinusoidal motion in the output cylinders 120. A careful selection of the air volume will match the spring rate of the input cylinders 110 to an ideal value for maximum energy capture by the wave energy converter.

In some embodiments, the offset cylinders 130 are connected to the hydraulic connection 140 along with the input cylinders 110. The hydraulic connection 140 may be configured to switch the offset cylinders 130 into and out of the hydraulic connection between the input cylinders 110 and the output cylinders 120.

In other configurations, additional input cylinders 110 may be configured as offset cylinders 130. In an offset configuration, the offset cylinders 130 collectively apply a mean offset force equal to a static mass of the underwater structure 104, or the mass pulling down on the tether 106. The input loads oscillate above and below the mean offset load supplied by the offset cylinders 130. The oscillations are transferred to the output cylinders 120 with a load to displacement ratio selected by the set of active input cylinders 110 and output cylinders 120.

In some embodiments, the offset cylinders 130 are connected to or are part of a hydraulic and/or pneumatic system that absorbs energy as tension increases in the tether 106. The bore chamber of the offset cylinder 130 is connected to a gas-charged accumulator 131 with at least one external, extendable air tank 132. The absorption of elastic energy by the external air tank 132 provides a restoring spring functionality that is fundamental to optimal performance in a wave energy converter system. In some embodiments, the system is a pneumatic spring system and the pneumatic spring system is integrated into the linear drive-train and also provides simultaneously a tunable mean offset load for the offset cylinders 130.

Figure 5:
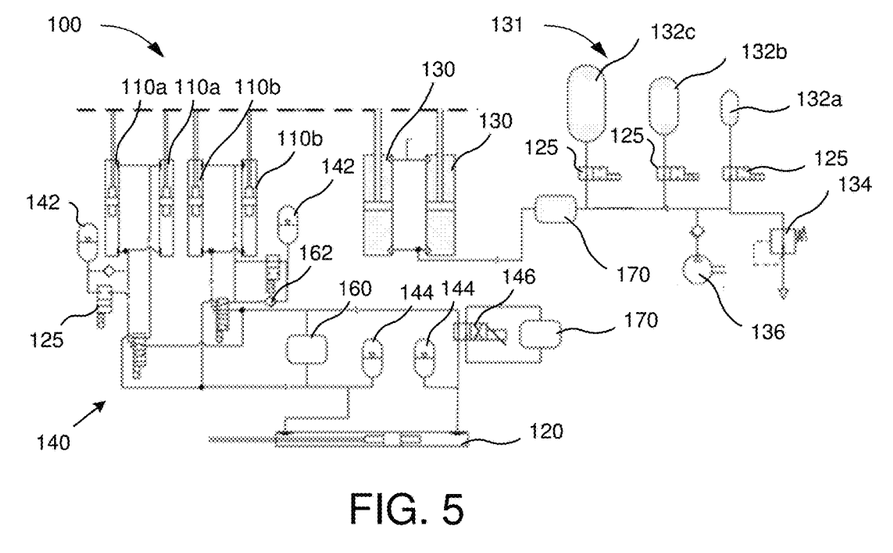
FIG. 5 is a schematic diagram illustrating one embodiment of a power transfer system for a wave energy converter in accordance with one embodiment of the present invention.

In some implementations, the output cylinders 120 are pneumatically operated, and the bore chamber is connected directly to an external air tank, similar to those connected to the offset cylinders 130 in FIG. 5. Removing the need for an accumulator driven air tank system may be advantageous when the air system is in close proximity to the output cylinders 120.

In some implementations, the output cylinders are pneumatically operated, and the bore chamber is connected directly to an external air tank. Removing the need for an accumulator driven air tank system may be advantageous when the air system is in close proximity to the output cylinders. When an air spring system is broadly distributed across the power transfer system 100, and located far from the physical location of the offset cylinders 130 to the air tanks 132 via hydraulic fluid and an intermediate gas charged accumulator will provide greater, and in some instances necessary, system responsiveness.

Due to dynamic flow conditions when input cylinders 110 and/or output cylinders 120 are brought in and out of an active state, the volume of hydraulic fluid in the annulus and bore chambers of the hydraulic cylinders may change over time. Also, even in a perfectly designed system, gradual leaks are present as a function of seal lubrication that result in fluid bypassing the seals of the hydraulic cylinders and there may be loss of fluid from other points in the system connections that are vulnerable to leaks over time. As the implementation described here is a closed hydraulic system, a mechanism to ensure that the hydraulic fluid volumes stay constant in the system may be used.

Some embodiments include a fluid balancing network 160. In some embodiments, the fluid balancing network 160 allows for the transfer of hydraulic fluid from the bore side of the input cylinders 110 and/or the output cylinders 120 to the annulus side, and also for the addition of supplemental fluid from an external tank. In some embodiments, the fluid balancing network 160 allows the replacement of lost hydraulic fluid without interfering with the normal operation of the hydraulic system.

Without a fluid balancing network 160, any leaks that bridge the isolation between the bore and the annulus of the hydraulic cylinders would introduce an error in the equilibrium position of the cylinders such that the mean position of the input cylinders 110 and output cylinders 120 oscillates around a point that is offset from the midpoint of the hydraulic cylinders.

Over time, position error may accumulate and the piston rod engages the end-stops under otherwise normal operating conditions. A position error typically only emerges for active cylinders. Passive input cylinders may have the bore and annulus chambers connected, removing the possibility for fluid to collect in one chamber at the expense of the other. Active input cylinders 110, that is those cylinders hydraulically connected to the output cylinders 120, have isolated bore and annulus chambers, so the loss of fluid in any chamber results in a displacement error for the system.

Figure 6:
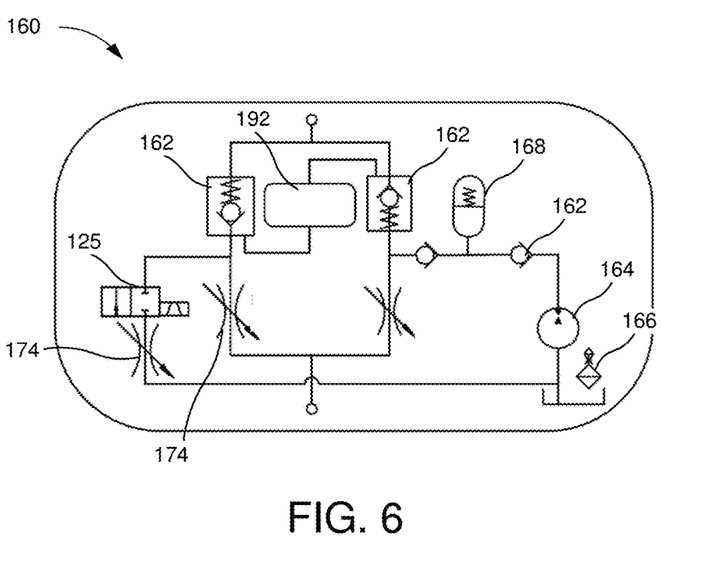
FIG. 6 is a schematic diagram illustrating one embodiment of a fluid balancing network in accordance with one embodiment of the present invention.

To compensate for position error, the fluid balancing network 160 selectively introduces a low-flow transfer of fluid to re-establish a proper volume balance for four failure cases, which are described more fully in conjunction with FIG. 6.

Returning to the output cylinders 120, power is transferred from the input cylinders 110 to the output cylinders through the transfer of hydraulic fluid. As the tether 106 cycles through the oscillating motion, the hydraulic fluid within the input cylinders 110 is expelled and transferred into the output cylinders 120, which drives the cycling of the output cylinders 120. The output cylinders 120 are coupled to an electrical generator 150 to drive the electrical generator 150. The electrical generator 150 may further be coupled to a power grid 152 which can harvest the energy produced at the electrical generator.

During the cycling of the system, the waves on which the buoy housing 102 is deployed may increase and/or decrease over time. The power transfer system 100 may include various networks to ensure a more consistent production of energy. Some embodiments of the power transfer system 100 include a power dissipation network 170 which may be connected at one or more points within the system.

In some embodiments, the output cylinders 120 are a cluster of hydraulic cylinders that are connected to one or more hydraulic cylinders (the input cylinders 110) that together provide a variable volume of pressurized hydraulic fluid.

In some embodiments, the annulus chamber of the input cylinders 110 is connected to the annulus chamber of the output cylinders 120. In some embodiments, the bore chamber of the input cylinders 110 is connected to the bore chamber of the output cylinders 120. The ratio of the input annulus area to the input bore area matches the ratio of the output annulus area to the output bore area. Matching the bore to annulus area achieves a net zero flow of hydraulic fluid between the input cylinders 110 and output cylinders 120 as the hydraulic cylinders are cycled together. The volume of fluid exiting the output annulus port equals that entering the input annulus port, and likewise on the bore ports.

In some embodiments, a single output cylinder 120 is driven by the input cylinders 110. In such embodiments, the displacement multiplier of the system is determined only by the state of the hydraulic connection 140 (the valve system) interconnecting the input cylinders 110, that is, the number of active input cylinders 110. In other implementations, two or more output cylinders 120 are driven by the input cylinders 110, in which case the displacement multiplier of the gearbox system is determined by the active cylinders in both the input cylinder group and the output cylinder group. The output cylinders 120 are mechanically connected or coupled to a linear power take off mechanism, for example, an electrical generator. In some embodiments, the displacement amplification ratio may range from one-half to one hundred. In some embodiments, the displacement amplification ratio may range from one and a half to twenty, and more specifically from two to eight. The electrical generator 150 is able to convert this mechanical energy into electrical energy with very high efficiency (greater than eighty five percent may be typical).

Figure 2:
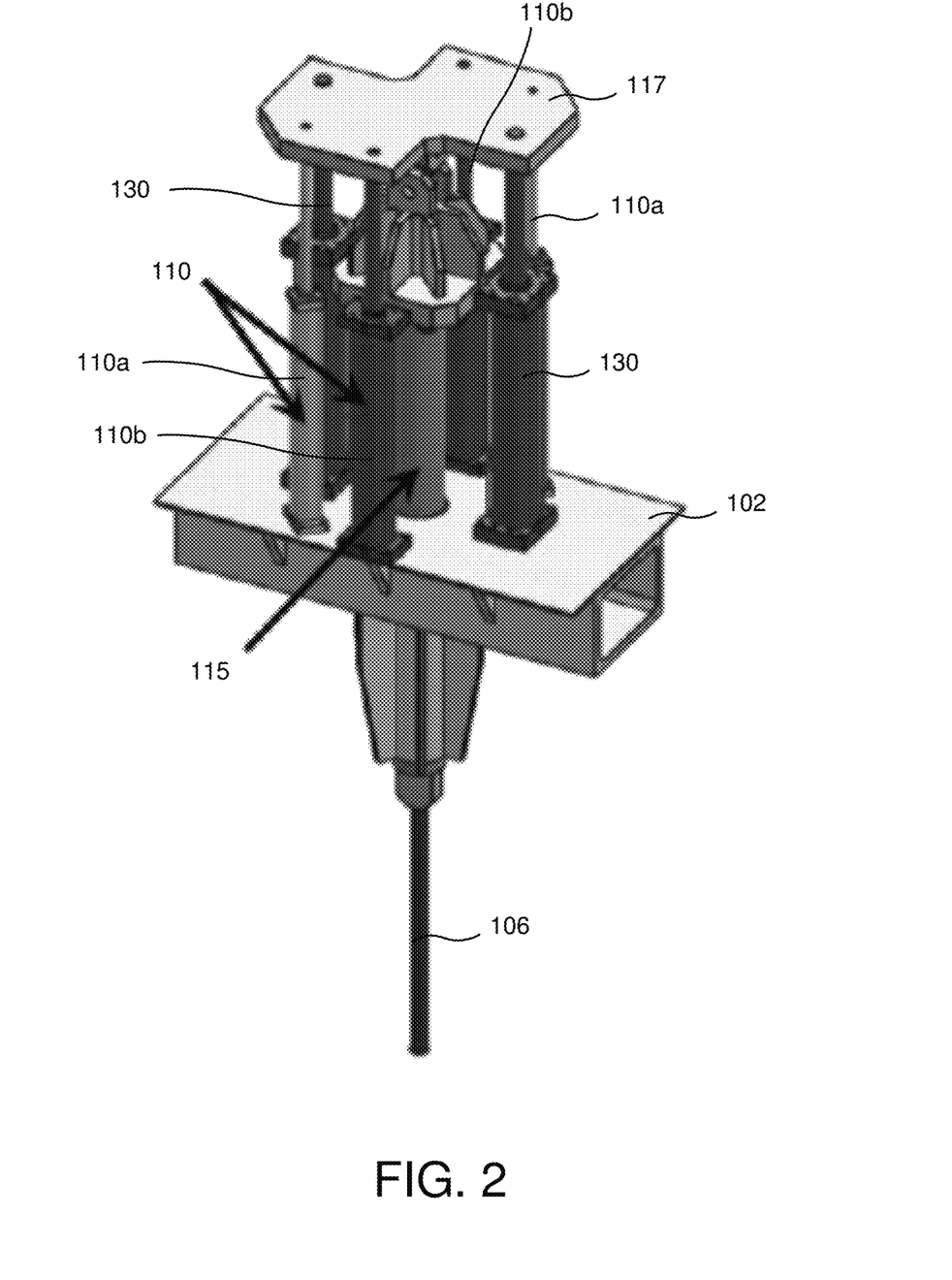
FIG. 2 is a perspective view illustrating the input cylinders, the offset cylinders, and the mechanical coupling with the tether in accordance with one embodiment of the present invention.

FIG. 2 is a perspective view illustrating the input cylinders 110, the offset cylinders 130, and the mechanical coupling with the tether 106 in accordance with one embodiment of the present invention. The tether 106 may be coupled at a first end (not shown) to an underwater structure 104. At a second end, the tether 106 is coupled to the buoy housing 102. The mechanical coupling of the tether to the buoy housing 102 and the hydraulic cylinders is depicted in FIG. 2.

As depicted, the power transfer system 100 includes a central linear bearing 115. The linear bearing 115 allows the tether 106 to move relative to the buoy housing 102. That is, as depicted, the linear bearing 115 may allow motion up and down through an opening in the buoy housing 102. The linear bearing 115 and the tether 106 are coupled to structural member 117. In the illustrated embodiment, the structural member 117 is merely a rigid plate.

As the tether 106 oscillated upwards and downwards through the opening in the buoy housing 102, the structural member 117 will move upwards away from the depicted portion of the buoy housing 102 and downwards and towards the depicted portion of the buoy housing 102. In other words, the structural member 117 will oscillate up and down relative the buoy housing 102 as the tether 106 oscillates.

Also connected to the structural member 117 are the input cylinders 110. In some embodiments, the structural member 117 is mechanically coupled to the input cylinders 110. In the illustrated embodiment, the piston rods of the input cylinders 110 are fixedly coupled to the structural member 117. As the structural member 117 oscillates up and down so too will the piston rods of the input cylinders 110.

In addition, offset cylinders 130 are depicted showing the offset cylinders 130 also coupled to the structural member 117. The offset cylinders 130 provide functionality described herein. Generally, the offset cylinders 130 offset the weight of the tether 106 and the underwater structure 104. As the tether 106 pulls the structural member 117 down, the offset cylinders 130 displace hydraulic fluid into an accumulator or a gas charged accumulator which resists and provides a restoring force to cycle the structural member 117, in some embodiments, back up.

In the illustrated embodiment, the input cylinders 110 and the offset cylinders 130 are mechanically coupled at their opposite ends to the buoy housing 102. The illustrated embodiment includes two groups of input cylinders 110 including a first group 110a of input cylinders and a second group 110b of input cylinders. The first group 110a and/or the second group 110b may be switched into or out of the hydraulic connection to the output cylinders 120 (which are not depicted in FIG. 2).

In the illustrated embodiment, a multiple input cylinder arrangement is shown. This would be suitable for input cylinder arrangements that involve higher forces and longer travels, as the loads can be distributed across multiple input cylinders 110. Without excluding other possible configurations, FIG. 2 shows two pairs of input hydraulic cylinders, the first group 110a and the second group 110b.

At any time, by way of the hydraulic connection 140, each cylinder may operate in one of two modes: 1) passive, or 2) active. Passive is a disconnected position, where the bore chamber of each cylinder is connected only its own annulus chamber (and an external volume mismatch reservoir). That is, a passive input cylinder 110 is not hydraulically connected to the output cylinders 120. In the active position, the bore and annulus chambers of the input cylinder 110 are connected to the bore and annulus chambers of the output cylinders 120.

In another arrangement, input cylinders 110 may be attached to the reverse side of the structural member 117 in addition to, or independent of any cylinders that are positioned under the structural member 117 as shown in FIG. 2.

The arrangement in FIG. 2 shows two pairs of input cylinders 110 and a pair of offset cylinders 130 and splits the loads equally between them. Cylinders are shown in pairs to demonstrate an implementation that aligns the centroid of the forces applied by each input cylinder 110 to the axis of the linear bearing 115.

Additional pairs of input cylinders 110 could potentially be added, and allow additional alternative multiplication ratios to be achieved between the input and output of the hydraulics. In FIG. 2, the input cylinders 110 and the offset cylinders 130 are arranged in a single concentric ring around the structural member 117 (see also FIG. 4 for a top view).

In other implementations, input cylinders could be arranged in multiple concentric rings. In other implementations, multiple linear bearings may be arranged in a pattern interspersed among the input cylinders. In some embodiments, the input cylinders 110 are arranged mechanically in parallel to each other. In some embodiments, the input cylinders 110 are arranged hydraulically in parallel to each other.

In some embodiments, the input cylinders 110 are spatially distributed so as to align the centroid of all the resultant force with the axis of a linear bearing 115, or with the centroid of multiple linear bearings.

Figure 3:
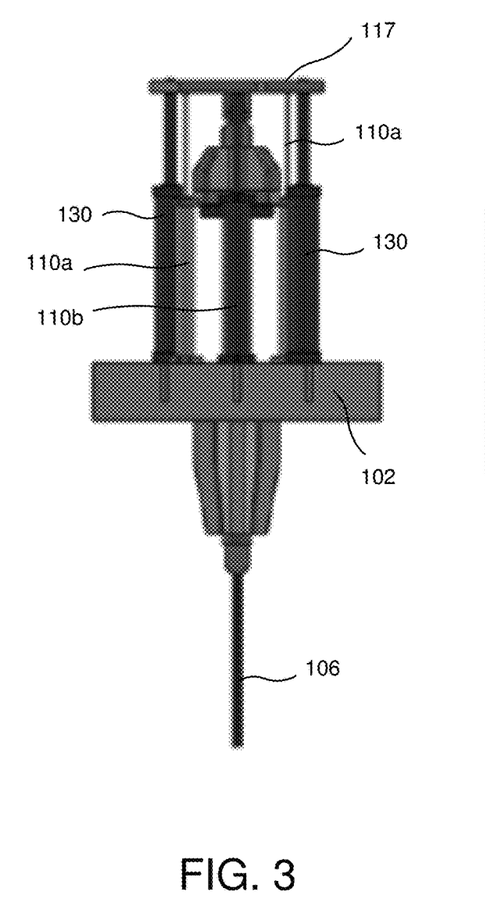
FIG. 3 is a side view illustrating the input cylinders, the offset cylinders, and the mechanical coupling with the tether in accordance with one embodiment of the present invention.
Figure 4:
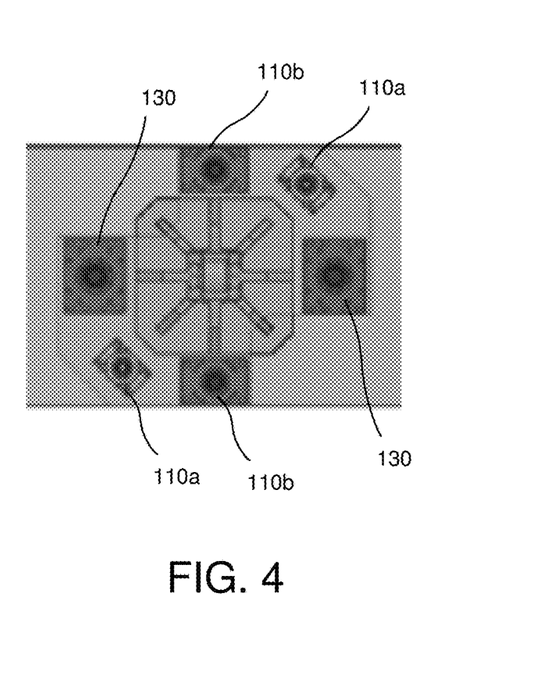
FIG. 4 is a top view illustrating the input cylinders, the offset cylinders, and the mechanical coupling with the tether in accordance with one embodiment of the present invention.

FIG. 3 is a side view and FIG. 4 is a top view illustrating the input cylinders 110, the offset cylinders 130, and the mechanical coupling with the tether 106 in accordance with one embodiment of the present invention.

FIG. 5 is a schematic diagram illustrating one embodiment of a power transfer system 100 for a wave energy converter in accordance with one embodiment of the present invention. Depicted schematically, the power transfer system 100 may include fewer or more components to implement less or more functionality in other embodiments.

The schematic diagram depicts two groups of input cylinders 110 which are hydraulically connected to an output cylinder 120. The hydraulic connection 140 includes various valves 125, one way valves 162, accumulators 142, overpressure systems 144, actuators 146 to hydraulically connect the input cylinders 110 to the output cylinder 120.

By way of the hydraulic connection 140, individual input cylinders 110 or groups of input cylinders 110 may be switched into or out of the hydraulic connection to allow the tuning of the ration of the area of the input cylinders 110 to the area of the output cylinder 120. The illustrated embodiment, includes accumulators 142 and overpressure systems 144 which may lead to smoothing and absorb any overpressure in the system. In some implementations, energy absorbed into these accumulators 142 and overpressure systems 144 is retained and released at a moment when the system pressure is below average.

In embodiments of the invention, the linear motion induced by the tether 106 (and structural member 117) provides a variable quantity of hydraulic fluid. An optimum pressure can be tuned to match all the input forces in order to achieve a maximum power transfer from the input cylinders 110 to the output cylinders 120 in a single, closed, self-repairing system. The closed, self-repairing system may include a fluid balancing network 160 and a power dissipation network 170.

Also depicted in FIG. 5, are offset cylinders 130 and a gas charged accumulator 131. The offset cylinders 130 may be charged or pressurized and that provide an offset force to counteract the weight of the underwater structure 104.

In the illustrated embodiment, a power dissipation network 170 is also coupled between the offset cylinders 130 and the gas charged accumulator 131. As the offset cylinders 130 cycle and oscillate, the fluid of the offset cylinders 130 drives an air tank array. The illustrate embodiment includes an air tank array with three air tanks (132a, 132b, and 132c) or air tank arrays in parallel to each other. Valves 125 dictate which of the air tanks are in use at any given time. Also depicted are an air compressor 136 and a relief valve 134 which may provide balance to the gas charged accumulator 131 and also charge or pressurize the gas charged accumulator 131.

In the illustrated embodiment, the air tank array includes an array of differently sized air tanks (132a, 132b, and 132c). The air tanks are extendable air reservoirs which provide elastic absorption of energy with an effective spring constant being a function of the extendable air volume in the air tank array. That is, as the air tanks fill they have an effective spring constant that adjusts with the air volume in the air tank array.

In some embodiments, the hydraulic fluid of the offset cylinders 130 when expelled and driven into the gas charged accumulator 131 will drive the filling of the air tank array. In some embodiments, the extendable air volume is configured to provide a variable pressure providing an offset force to the weight of the underwater structure 104.

Figure 7:
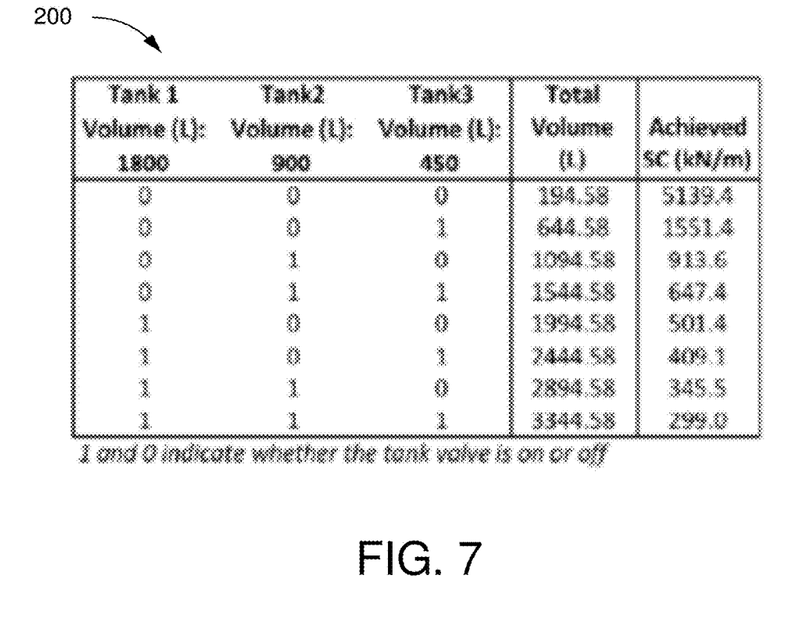
FIG. 7 is a table illustrating one embodiment of a relationship between an air tank size with an effective spring constant in accordance with one embodiment of the present invention.
Figure 8:
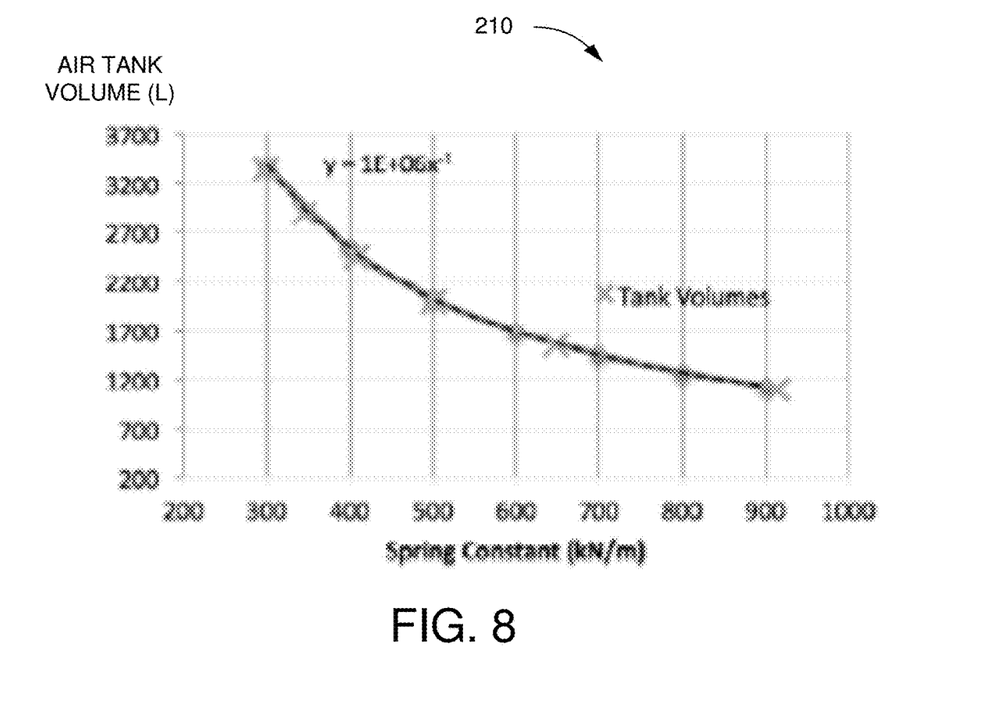
FIG. 8 is a graphical representation illustrating one embodiment of a relationship between an air tank size with an effective spring constant in accordance with one embodiment of the present invention.

The relationship between the air tank size and the effective spring constant, in an embodiment, is depicted in FIGS. 7 and 8.

The selection of the air tank may be dictated by the selection of the particular input cylinders 110 or output cylinders 120 that are selected. That is, a particular ratio of area of the input cylinders 110 to the area of the output cylinders 120 may dictate the selection of the particular air tank. The valves 125 in the gas charged accumulator 131 may also be remotely controlled to allow for optimum deployment of the power transfer system 100. With remote control of the various valves and actuator, the selection of the input cylinders 110 and/or output cylinders 120 may be controlled simultaneously with the selection of the particular air tank.

Figure 9:
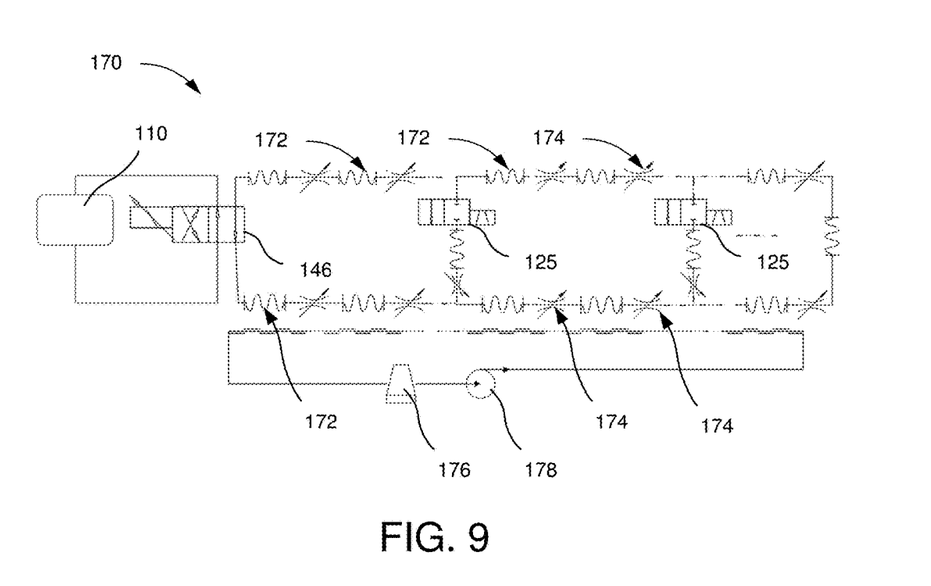
FIG. 9 is a schematic diagram illustrating one embodiment of a power dissipation network in accordance with one embodiment of the present invention.

In some implementations, a power dissipation network 170 may be connected in series with the external air tanks in order to shed some power as described in conjunction with FIG. 9.

In some implementations, the external air tank is not a single air chamber, but multiple distinct chambers arranged in parallel and interconnected via valves 125 that isolate or engage individual chambers or particular air tanks (132a, 132b, and 132c). In some implementations, three tanks are selected and engaged in a binary fashion, achieving a range of volumes and spring rates.

FIG. 7 is a table 200 illustrating one embodiment of a relationship between air tank sizes and an effective spring constant in accordance with one embodiment of the present invention. FIG. 8 is a graphical representation 210 illustrating one embodiment of a relationship between air tank sizes and an effective spring constant in accordance with one embodiment of the present invention. The X's on the graphical representation of FIG. 8 represent the achievable spring constant identified in the table in FIG. 7.

FIG. 6 is a schematic diagram illustrating one embodiment of a fluid balancing network 160 in accordance with one embodiment of the present invention. As described above, the fluid balancing network 160 selectively introduces a low-flow transfer of fluid to re-establish a proper volume balance. The fluid balancing network 160 includes various one way valves 162, orifices 174, valves 125, a controller 192, spring loaded accumulators 168, pumps 164, filters 166, sensors, flow restrictors, and reservoirs to effectively keep balance within the various hydraulic cylinders of the power transfer system 100.

As described above, the fluid balancing network 160 selectively introduces a low-flow transfer of fluid to re-establish a proper volume balance for four failure cases.

In a first case, excess hydraulic fluid may have accumulated on the bore side of the active input cylinders 110. When the tether 106 is loaded, the bore chamber is pressurized while the annulus chamber is depressurized, pushing hydraulic fluid out of the input bore chamber and into the output bore chamber. The fluid balancing network 160 opens a secondary pathway to the input annulus chamber through a flow restrictor and one-way valve with very small diameter hydraulic connection. In some implementations, the hydraulic resistance of the restrictor valve and/or one-way valve is proportionally controlled, and determined by the magnitude of the position error. In this way a small percentage of the fluid volume exiting the input bore chamber is transferred to the input annulus chamber. A one-way valve is necessary to ensure that, over multiple cycles, the net flow is toward the annulus side.

In a second case, excess hydraulic fluid has accumulated on the annulus side of the active input cylinders 110. The fluid balancing network 160 opens a secondary pathway to the input bore chamber through a flow restrictor and one-way valve with very small diameter hydraulic connection. In some implementations, the hydraulic resistance of the restrictor valve and/or one-way valve is proportionally controlled, and determined by the magnitude of the position error. In this way a small percentage of the fluid volume exiting the input annulus chamber is transferred to the input bore chamber. A one-way valve is necessary to ensure that, over multiple cycles, the net flow is toward the bore side.

In a third case, the hydraulic system has suffered a net loss of fluid via external leaks, and the fluid balance has accumulated on the bore side of the active input cylinder. A high pressure source re-introduces a regulated volume of fluid into an accumulator that interfaces with the fluid balancing network 160 through a one-way valve. When the tether 106 is unloaded, the bore side is depressurized, and hydraulic fluid from the accumulator will flow into the system, through the one-way valve, adding fluid to the system. Excess fluid in the bore side is distributed to the annulus side as needed and as described above in the first case or the second case, depending on the position error. Fluid is metered into the system until all lost fluid has been replenished.

In a fourth case, excess fluid has been introduced into the system, resulting in a mean load error. In this case fluid is removed from the closed system by way of a valve and/or a low flow valve.

As the leak rate past the cylinder seals is expected to be very slow in a properly functioning system, it is anticipated that the fluid balancing network 160 will be engaged on an as-needed basis when the mean cylinder offset drifts past tolerances. As the transfer of hydraulic fluid is slow, the system adjusts over many cycles and is able to otherwise function as normal.

In some embodiments, the fluid balancing network 160 includes an external supply of fluid configurable to enter the input cylinders 110 to compensate for fluid loss in the input cylinders 110. In some embodiments, the fluid balancing network 160 includes an external supply of fluid configurable to enter the output cylinders 120 to compensate for fluid loss in the output cylinders 120. In some embodiments, the fluid balancing network 160 includes an external supply of fluid configurable to enter the offset cylinders 130 to compensate for fluid loss in the offset cylinders 130.

FIG. 9 is a schematic diagram illustrating one embodiment of a power dissipation network 170 in accordance with one embodiment of the present invention. Under some sea conditions, the wave energy converter will absorb more energy than the electric generator can absorb. In such instances, the power transfer system 100 should be able to shed some of this energy in a way that will prevent damage of the electric generator 150 and the hydraulic systems. In some embodiments this is done through a power dissipation network 170.

Referring to FIG. 9, a power dissipation network 170 is shown connected to an isolated hydraulic system. In the illustrated embodiment, the power dissipation network 170 is coupled to the input cylinders 110 but may also be or alternatively coupled to the output cylinders 120 and/or the offset cylinders.

The power dissipation network 170 may be deployed at one more points within the power transfer system 100. Within the various hydraulic and pneumatic circuits described herein a series of loops may be deployed. The series of loops may include pressure reducing valves and coolers to add additional energy dissipation during high wave cases. In some implementations, a proportional valve 125 may control the distribution of fluid power between the electric generator 150 and the power dissipation network 170 by diverting excess power to the power dissipation network 170.

The illustrated embodiment includes an actuator 146 which allows for the diversion of any amount of hydraulic fluid necessary into the loops of the power dissipation network 170. The power dissipation network 170 includes various orifices 174 and various heat exchangers 172 though which the hydraulic fluid travels. The power dissipation network 170 also may include valves 125 which may short circuit to allow the loop to become smaller or larger depending on the need of energy dissipation.

The heat exchangers 172 may be wrapped around a circulating liquid heat exchanger 176 which re-circulates the liquid through a re-circulating pump 178. The heat exchangers 172 with the hydraulic fluid are wrapped around the cooling liquid heat exchanger 176 and the heat is dissipated.

In some implementations, multiple concatenated power dissipation networks 170 may be selectively engaged based on the amount of power that must be shed per cycle.

In some embodiments, the power dissipation network 170 includes a network of pressure reducing valves configured to dissipate energy by passing fluid through controlled diameter orifices 174 to create heat and then cooling the fluid by passing through a heat exchanger network of heat exchangers 172.

Some embodiments described herein benefit from the location of the electrical generator(s) as included inside the buoy housing 102 and separated from the water. The load generated by relative motion of the buoy housing 102 and the underwater structure 104 can be transferred to one or more electrical generators 150 inside the buoy housing 102. In another embodiment, a single, bottom-founded housing (not shown) would have many of the same benefits. The configuration could be similar to any buoy-housed configuration, as the bottom-founded concept is essentially an upside-down version of the buoy housing disposed at the bottom of the tether(s) 106. This configuration could be advantageous in that the direction of loading could be reversed through a pulley, gear of alternative system, which, in combination with the bottom founding, could simplify the structural requirements of the enclosure. The bottom-founded system would also avoid an increase in buoy size that might be necessary in the buoy-housed configuration in order to meet the buoyancy requirements related to survivability. Such a configuration would also eliminate the need for the electrical umbilical cords that would run from the buoy to the ocean floor in the buoy-housed configuration, which could increase the reliability of the system.

This application is related to U.S. application Ser. No. 15/217,772, filed on Jul. 22, 2016, which is incorporated by reference herein in its entirety. This application also is related to U.S. application Ser. No. 14/181,574, filed on Feb. 14, 2014, which claims the benefit of priority of U.S. application Ser. No. 61/809,155, filed on Apr. 5, 2013. This application is related to U.S. application Ser. No. 15/268,341, filed on Sep. 16, 2016.

What is claimed is:

1. A power transfer system for a wave energy converter, comprising:
   a plurality of hydraulic cylinders comprising a first cluster of input cylinders and a second cluster of output cylinders;
   the input cylinders coupled to an underwater structure and configured to receive an input force from a relative motion between a buoy housing and the underwater structure;
   the output cylinders configured to transfer an output force to an electric generator;
   a hydraulic connection between the input cylinders and the output cylinders; and
   wherein the hydraulic connection is configurable to switch a portion of the hydraulic cylinders into and out of the hydraulic connection between the input cylinders and the output cylinders.

2. The power transfer system of claim 1, further comprising at least one offset cylinder, the at least one offset cylinder configured to offset a weight of the underwater structure.

3. The power transfer system of claim 2, wherein the offset cylinder is coupled to a gas charged accumulator.

4. The power transfer system of claim 2, wherein the offset cylinder is pressurized to provide an offset force opposite to the weight of the underwater structure.

5. The power transfer system of claim 2, wherein the offset cylinder is one of a hydraulic system or pneumatic system.

6. The power transfer system of claim 2, wherein the offset cylinder is hydraulically isolated from the output cylinders.

7. The power transfer system of claim 2, wherein the offset cylinder is coupled to a gas charged accumulator with an air tank array, and wherein the air tank array comprises an array of differently sized air tanks.

8. The power transfer system of claim 1, wherein the input cylinders are arranged mechanically and hydraulically in parallel to each other.

9. The power transfer system of claim 1, wherein the input cylinders comprise a first group of input cylinders and a second group of input cylinders having a different size than the first group.

10. The power transfer system of claim 1, wherein the input cylinders are spatially distributed on a structural member, the structural member mechanically coupled to the input cylinders.

11. The power transfer system of claim 1, further comprising a power dissipation network, and one or more valves to control distribution of power between the electrical generator and the power dissipation network.

12. The power transfer system of claim 11, wherein the power dissipation network comprises a network of pressure reducing valves configured to dissipate energy by passing fluid through controlled diameter orifices to create heat and then cooling the fluid by passing through a heat exchanger network.

13. A power transfer system for a wave energy converter, comprising:
    a plurality of hydraulic cylinders comprising a first cluster of input cylinders and a second cluster of output cylinders;
    the input cylinders coupled to an underwater structure and configured to receive an input force from a relative motion between a buoy housing and the underwater structure;
    the output cylinders configured to transfer an output force to a linear generator;
    a hydraulic connection between the input cylinders and the output cylinders; and
    at least one offset cylinder configured to offset a weight of the underwater structure.

14. The power transfer system of claim 13, wherein the hydraulic connection is configurable to switch a portion of the hydraulic cylinders into and out of the hydraulic connection between the input cylinders and the output cylinders.

15. The power transfer system of claim 13, wherein the offset cylinder is coupled to a gas charged accumulator with an air tank array, and wherein the accumulator provides elastic absorption of energy with an effective spring constant being a function of an extendable air volume in the air tank array.

16. The power transfer system of claim 13, wherein the extendable air volume is configured to provide a variable pressure providing an offset force to the weight of the underwater structure.

17. The power transfer system of claim 13, further comprising a power dissipation network connected in series with the air tank array.

18. The power transfer system of claim 13, wherein the power dissipation network comprises a network of pressure reducing valves configured to dissipate energy by passing fluid through controlled diameter orifices to create heat and then cooling the fluid by passing through a heat exchanger network.

19. The power transfer system of claim 13, further comprising a fluid balancing network comprising an external supply of fluid configurable to enter the input cylinders to compensate for fluid loss in the input cylinders.

20. A power transfer system for a wave energy converter, comprising:
    a plurality of hydraulic cylinders comprising a first cluster of input cylinders and a second cluster of output cylinders, the input cylinders coupled to an underwater structure and configured to receive an input force from a relative motion between a buoy housing and the underwater structure, the output cylinders configured to transfer an output force to a linear generator;

a hydraulic connection between the input cylinders and the output cylinders, wherein the hydraulic connection is configurable to switch a portion of the hydraulic cylinders into and out of the hydraulic connection between the input cylinders and the output cylinders;

at least one offset cylinder configured to offset a weight of the underwater structure, wherein the offset cylinder is coupled to a gas charged accumulator with an air tank array, and wherein the air tank array comprises an array of differently sized air tanks; and a power dissipation network with one or more valves to control distribution of power between the electrical generator and the power dissipation network.

* * * * *